United States Patent
Stroila (10) Patent No.: US 10,795,363 B2
(45) Date of Patent: Oct. 6, 2020

(54) METHOD AND APPARATUS FOR SYNCHRONIZING ROUTES OF AN AUTONOMOUS VEHICLE AND A PEDESTRIAN OR BICYCLIST

(71) Applicant: HERE GLOBAL B.V., Eindhoven (NL)

(72) Inventor: Matei Stroila, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 42 days.

(21) Appl. No.: 16/178,651

(22) Filed: Nov. 2, 2018

(65) Prior Publication Data
US 2020/0142404 A1    May 7, 2020

(51) Int. Cl.
| | | |
|---|---|---|
| G05D 1/00 | (2006.01) | |
| G08G 1/005 | (2006.01) | |
| G01C 21/34 | (2006.01) | |
| G05D 1/02 | (2020.01) | |
| G08G 1/0967 | (2006.01) | |

(52) U.S. Cl.
CPC ....... G05D 1/0088 (2013.01); G01C 21/3415 (2013.01); G05D 1/0212 (2013.01); G08G 1/005 (2013.01); G08G 1/096725 (2013.01); G05D 2201/0213 (2013.01)

(58) Field of Classification Search
CPC .............. G05D 1/0088; G05D 1/0212; G05D 2201/0213; G01C 21/3415; G08G 1/005; G08G 1/096725; G08G 1/0955; G08G 1/096716; G08G 1/096775; G08G 1/09; G08G 1/0175; G08G 1/01; G08G 1/015; B60Q 1/32; B60Q 2400/50; B60Q 1/525; B60Q 1/0023; B60Q 1/50; B60Q 5/006; B60Q 9/008; B62J 6/04; H04N 9/3173
See application file for complete search history.

(56) References Cited

U.S. PATENT DOCUMENTS

| | | | |
|---|---|---|---|
| 9,656,602 B2 | 5/2017 | Needham et al. | |
| 2006/0004514 A1 | 1/2006 | Bennett et al. | |
| 2016/0144915 A1 | 5/2016 | Bejestan et al. | |
| 2016/0280127 A1* | 9/2016 | Needham | H04N 9/3173 |
| 2017/0309174 A1* | 10/2017 | Gonzales | G08G 1/09 |
| 2018/0361919 A1* | 12/2018 | Sorokin | B60Q 1/525 |

FOREIGN PATENT DOCUMENTS

WO    WO 2017/102695 A1    6/2017

* cited by examiner

*Primary Examiner* — Anne Marie Antonucci
*Assistant Examiner* — Andrew J Cromer
(74) *Attorney, Agent, or Firm* — Alston & Bird LLP (57) ABSTRACT

A method, apparatus and computer program product are provided to facilitate movement of a pedestrian or bicyclist along a route. In the context of a method, routes of one or more autonomous vehicles and of a pedestrian or bicyclist are synchronized. The method includes receiving a route of the pedestrian or bicyclist that extends at least partially along a road network comprised of a plurality of road segments. The method also includes accessing routes to be driven by the one or more autonomous vehicles. The method further includes synchronizing the route of the pedestrians or bicyclists with the route of the one or more autonomous vehicles such that the one or more autonomous vehicles drive alongside the pedestrian or bicyclist while the pedestrian or bicyclist proceeds along with at least a portion of the route.

20 Claims, 6 Drawing Sheets

METHOD AND APPARATUS FOR SYNCHRONIZING ROUTES OF AN AUTONOMOUS VEHICLE AND A PEDESTRIAN OR BICYCLIST

TECHNOLOGICAL FIELD

An example embodiment relates generally to a method, apparatus and computer program product for facilitating movement of a pedestrian or bicyclist along a route and, more particularly, for synchronizing routes of one or more autonomous vehicles and of a pedestrian or bicyclist or otherwise coordinating one or more traffic control elements in a road network infrastructure with a route of a pedestrian or bicyclist.

BACKGROUND

Pedestrians, such as runners or walkers, and bicyclists may be challenged to navigate a route, particularly in an urban environment. In this regard, many obstacles and inconveniences may impede the progress of a pedestrian or bicyclist and interrupt their movement along the route, thereby not only causing the pedestrian or bicyclist to take longer to complete the route but also potentially reducing the health benefits attributable to running, walking or bicycling along the route. The obstacles or impediments may come in many forms including traffic control elements of the road network infrastructure. For example, traffic control elements such as traffic lights, crosswalks or other road signs may direct the pedestrian or bicyclist to stop, such as to permit cross traffic to proceed, and require the pedestrian or bicyclist to wait until the traffic control element signals to the pedestrian or bicyclist to proceed.

Additionally, some roads may lack both a bicycle lane and a sidewalk, thereby requiring a pedestrian or bicyclist to proceed along the edge of the roadway. For example, the roadway may be constructed without a bicycle lane or a sidewalk or construction on the roadway may prevent access to a bicycle lane or a sidewalk and force the pedestrian or bicyclist to proceed along the edge of the roadway. In such situations, a pedestrian or bicyclist may be concerned with respect to their safety as a result of sharing the roadway with motorized vehicles, particularly in settings in which the visibility is somewhat limited, such as at night or during adverse weather conditions. As such, pedestrians or bicyclists may sometimes stop or otherwise have to move off to the side of the roadway in order to allow motorized vehicles to pass, thereby again interrupting the progress of the pedestrian or bicyclist along the route.

BRIEF SUMMARY

A method, apparatus and computer program product are provided in accordance with an example embodiment in order to facilitate movement of a pedestrian or bicyclist along a route. In an example embodiment, a method, apparatus and computer program product are provided in order to synchronize routes of one or more autonomous vehicles and of a pedestrian or bicyclist. As such, the one or more autonomous vehicles may drive alongside the pedestrian or bicyclist along at least a portion of a route in order to protect the pedestrian or bicyclist, particularly in instances in which the pedestrian or bicyclist must share the roadway with motorized vehicles. In another example embodiment, a method, apparatus and computer program product are provided in order to coordinate one or more traffic control elements of a road network infrastructure with a route of a pedestrian or bicyclist. As such, the pedestrian or bicyclist may proceed along the route in a more expeditious manner, thereby reducing the time required to complete the route and potentially increasing the health benefits attributable to running, walking or bicycling along the route.

In an example embodiment, a method is provided for synchronizing routes of one or more autonomous vehicles and of a pedestrian or bicyclist. The method includes receiving a route of the pedestrian or bicyclist that extends at least partially along a road network comprised of a plurality of road segments. The method also includes accessing routes to be driven by the one or more autonomous vehicles. The method further includes synchronizing the route of the pedestrians or bicyclists with the route of the one or more autonomous vehicles such that the one or more autonomous vehicles drive alongside the pedestrian or bicyclist while the pedestrian or bicyclist proceeds along with at least a portion of the route. In an example embodiment, the method also includes providing for autonomous control of the one or more autonomous vehicles so as to drive alongside a pedestrian or bicyclist while the pedestrian or bicyclist proceeds along at least a portion of the route.

In an example embodiment, synchronizing the route of the pedestrian or bicyclist with the route of the one or more autonomous vehicles includes analyzing the routes of a plurality of autonomous vehicles to identify the route of the one or more autonomous vehicles that corresponds to the route of the pedestrian or bicyclist in terms of the one or more road segments included in the routes and a time at which the one or more autonomous vehicles and the pedestrian or bicyclist will proceed along the one or more road segments. In this example embodiment, synchronizing the route of the pedestrian or bicyclist with the route of the one or more autonomous vehicles includes modifying one or more road segments included in the route of the pedestrian or bicyclist or the time at which the pedestrian or bicyclist will proceed along the one or more road segments in order to correspond to the route of the one or more autonomous vehicles. Additionally or alternatively, in this example embodiment, synchronizing the route of the pedestrian or bicyclist with the route of the one or more autonomous vehicles includes modifying one or more road segments included in the route of the one or more autonomous vehicles or the time at which the one or more autonomous vehicles will proceed along the one or more road segments in order to correspond to the route of the pedestrian or bicyclist.

In an example embodiment, synchronizing the route of the pedestrian or bicyclist with the route of the one or more autonomous vehicles includes synchronizing a first portion of the route of the pedestrian or bicyclist with the route of a first autonomous vehicle and synchronizing a second portion of the route of the pedestrian or bicyclist with the route of a second autonomous vehicle. The method of an example embodiment further includes supporting communication between the pedestrian or the bicyclist or a device carried by the pedestrian or the bicyclist and the one or more autonomous vehicles while the one or more autonomous vehicles drive alongside the pedestrian or bicyclist. The method of an example embodiment further includes providing for an augmented reality presentation to the pedestrian or the bicyclist in order to provide an indication of the one or more autonomous vehicles that drive alongside the pedestrian or bicyclist or a virtual lane established for the pedestrian or bicyclist by the one or more autonomous vehicles that drive alongside the pedestrian or bicyclist.

In another embodiment, an apparatus is provided for synchronizing routes of one or more autonomous vehicles and of a pedestrian or bicyclist. The apparatus includes at least one processor and at least one non-transitory memory including computer program code instructions stored therein with the computer program code instructions configured to, when executed by the at least one processor, cause the apparatus at least to receive a route of a pedestrian or bicyclist that extends at least partially along a road network comprised of a plurality of road segments. The computer program code instructions are also configured to, when executed by the at least one processor, cause the apparatus to access routes to be driven by one or more autonomous vehicles. The computer program code instructions are further configured to, when executed by the at least one processor, cause the apparatus to synchronize the route of the pedestrian or bicyclist with the route of the one or more autonomous vehicles such that the one or more autonomous vehicles drive alongside the pedestrian or bicyclist while the pedestrian or bicyclist proceeds along at least a portion of the route. In an example embodiment, the computer program code instructions are further configured to, when executed by the at least one processor, cause the apparatus to provide for autonomous control of the one or more autonomous vehicles so as to drive alongside the pedestrian or bicyclist while the pedestrian or bicyclist proceeds along at least a portion of the route.

The computer program code instructions are configured to, when executed by the at least one processor, cause the apparatus of an example embodiment to synchronize the route of the pedestrian or bicyclist with the route of the one or more autonomous vehicles by analyzing the routes of a plurality of autonomous vehicles to identify the route of the one or more autonomous vehicles that corresponds to the route of the pedestrian or bicyclist in terms of one or more road segments included in the routes and a time at which the one or more autonomous vehicles and the pedestrian or bicyclist will proceed along the one or more road segments. In this example embodiment, the computer program code instructions are configured to, when executed by the at least one processor, cause the apparatus to synchronize the route of the pedestrian or bicyclist with the route of the one or more autonomous vehicles by modifying one or more road segments included in the route of the pedestrian or bicyclist or the time at which the pedestrian or bicyclist will proceed along the one or more road segments in order to correspond to the route of the one or more autonomous vehicles. Additionally or alternatively, in an example embodiment, the computer program code instructions are further configured to, when executed by the at least one processor, cause the apparatus to synchronize the route of the pedestrian or bicyclist with the route of the one or more autonomous vehicles by modifying one or more road segments included in the route of the one or more autonomous vehicle or the time at which the one or more autonomous vehicle will proceed along the one or more road segments in order to correspond to the route of the pedestrian or bicyclist.

The computer program code instructions are further configured to, when executed by the at least one processor, cause the apparatus of an example embodiment to synchronize the route of the pedestrian or bicyclist with the route of the one or more autonomous vehicles by synchronizing a first portion of the route of the pedestrian or bicyclist with the route of a first autonomous vehicle and synchronizing a second portion of the route of the pedestrian or bicyclist with the route of a second autonomous vehicle. In an example embodiment, the computer program code instructions are further configured to, when executed by the at least one processor, cause the apparatus to support communication between the pedestrian or the bicyclist or a device carried by the pedestrian or the bicyclist and the one or more autonomous vehicles while the one or more autonomous vehicles drive alongside the pedestrian or bicyclist. The computer program code instructions are further configured to, when executed by the at least one processor, cause the apparatus of an example embodiment to provide for an augmented reality presentation to the pedestrian or the bicyclist in order to provide an indication of the one or more autonomous vehicles that drive alongside the pedestrian or bicyclist or a virtual lane established for the pedestrian or bicyclist by the one or more autonomous vehicles that drive alongside the pedestrian or bicyclist.

In a further example embodiment, a computer program product is provided for synchronizing routes of one or more autonomous vehicles and of a pedestrian or bicyclist. The computer program product includes at least one non-transitory computer-readable storage medium having computer-executable program code instructions stored therein with the computer-executable program code instructions including program code instructions to receive a route of a pedestrian or bicyclist that extends at least partially along a road network comprised of a plurality of road segments. The computer-executable program code instructions also include program code instructions to access routes to be driven by one or more autonomous vehicles. The computer-executable program code instructions further include program code instructions to synchronize the route of the pedestrian or bicyclist with the route of the one or more autonomous vehicles such that the one or more autonomous vehicles drive alongside the pedestrian or bicyclist while the pedestrian or bicyclist proceeds along at least a portion of the route. In an example embodiment, the computer-executable program code instructions also include program code instructions to provide for autonomous control of the one or more autonomous vehicles so as to drive alongside the pedestrian or bicyclist while the pedestrian or bicyclist proceeds along at least a portion of the route.

The program code instructions to synchronize the route of the pedestrian or bicyclist with the route of the one or more autonomous vehicles include program code instructions to analyze the routes of a plurality of autonomous vehicles to identify the route of the one or more autonomous vehicles that corresponds to the route of the pedestrian or bicyclist in terms of one or more road segments included in the routes and a time at which the one or more autonomous vehicles and the pedestrian or bicyclist will proceed along the one or more road segments. In this example embodiment, the program code instructions to synchronize the route of the pedestrian or bicyclist with the route of the one or more autonomous vehicles include program code instructions to modify one or more road segments included in the route of the pedestrian or bicyclist or the time at which the pedestrian or bicyclist will proceed along the one or more road segments in order to correspond to the route of the one or more autonomous vehicles. Additionally or alternatively, in an example embodiment, the program code instructions to synchronize the route of the pedestrian or bicyclist with the route of the one or more autonomous vehicles include program code instructions to modify one or more road segments included in the route of the one or more autonomous vehicle or the time at which the one or more autonomous vehicle will proceed along the one or more road segments in order to correspond to the route of the pedestrian or bicyclist.

In an example embodiment, the program code instructions to synchronize the route of the pedestrian or bicyclist with the route of the one or more autonomous vehicles include program code instructions to synchronize a first portion of the route of the pedestrian or bicyclist with the route of a first autonomous vehicle and synchronize a second portion of the route of the pedestrian or bicyclist with the route of a second autonomous vehicle. The computer-executable program code instructions of an example embodiment also include program code instructions to support communication between the pedestrian or the bicyclist or a device carried by the pedestrian or the bicyclist and the one or more autonomous vehicles while the one or more autonomous vehicles drive alongside the pedestrian or bicyclist. In an example embodiment, the computer-executable program code instructions include program code instructions to provide for an augmented reality presentation to the pedestrian or the bicyclist in order to provide an indication of the one or more autonomous vehicles that drive alongside the pedestrian or bicyclist or a virtual lane established for the pedestrian or bicyclist by the one or more autonomous vehicles that drive alongside the pedestrian or bicyclist.

In an example embodiment, an apparatus is provided for coordinating one or more traffic control elements, such as one or more road signs, crosswalk signals or traffic lights, of a road network infrastructure with a route of a pedestrian or bicyclist. The apparatus includes at least one processor and at least one non-transitory memory including computer program code instructions stored therein with the computer program code instructions configured to, when executed by the at least one processor, cause the apparatus at least to receive a route of a pedestrian or bicyclist that extends at least partially along a road network comprised of a plurality of road segments. The route of the pedestrian or bicyclist identifies one or more road segments included in the route and a time at which the pedestrian or bicyclist will proceed along the one or more road segments. Based upon the route of the pedestrian or the bicyclist, the computer program code instructions are also configured to, when executed by the at least one processor, cause the apparatus to control at least a portion of the road network infrastructure including the one or more traffic control elements such that the one or more traffic control elements permit the pedestrian or the bicyclist to proceed unimpeded along at least a portion of the route.

The computer program code instructions are also configured to, when executed by the at least one processor, cause the apparatus of an example embodiment to receive location information regarding a location of the pedestrian or the bicyclist along the route. In this example embodiment, the computer program code instructions are configured to, when executed by the at least one processor, cause the apparatus to control at least a portion of the road network infrastructure by controlling at least a portion of the road network infrastructure including the one or more traffic control elements based upon the location information. In an example embodiment, the computer program code instructions are also configured to, when executed by the at least one processor, cause the apparatus to receive information indicating a number of pedestrians or bicyclists who will proceed along the route. In this example embodiment, the computer program code instructions are configured to, when executed by the at least one processor, cause the apparatus to control at least a portion of the road network infrastructure by controlling at least a portion of the road network infrastructure including the one or more traffic control elements in a manner that is dependent upon the number of pedestrians or bicyclists satisfying a threshold.

In another example embodiment, a method is provided for coordinating one or more traffic control elements, such as one or more road signs, crosswalk signals or traffic lights, of a road network infrastructure with a route of a pedestrian or bicyclist. The method includes receiving a route of a pedestrian or bicyclist that extends at least partially along a road network comprised of a plurality of road segments. The route of the pedestrian or bicyclist identifies one or more road segments included in the route and a time at which the pedestrian or bicyclist will proceed along the one or more road segments. Based upon the route of the pedestrian or the bicyclist, the method also includes controlling at least a portion of the road network infrastructure including the one or more traffic control elements such that the one or more traffic control elements permit the pedestrian or the bicyclist to proceed unimpeded along at least a portion of the route.

The method of an example embodiment also includes receiving location information regarding a location of the pedestrian or the bicyclist along the route. In this example embodiment, the method controls at least a portion of the road network infrastructure by controlling at least a portion of the road network infrastructure including the one or more traffic control elements based upon the location information. In an example embodiment, the method also includes receiving information indicating a number of pedestrians or bicyclists who will proceed along the route. In this example embodiment, the method controls at least a portion of the road network infrastructure by controlling at least a portion of the road network infrastructure including the one or more traffic control elements in a manner that is dependent upon the number of pedestrians or bicyclists satisfying a threshold.

In another example embodiment, a computer program product is provided for coordinating one or more traffic control elements, such as one or more road signs, crosswalk signals or traffic lights, of a road network infrastructure with a route of a pedestrian or bicyclist. The computer program product includes at least one non-transitory computer-readable storage medium having computer-executable program code instructions stored therein with the computer-executable program code instructions including program code instructions to receive a route of a pedestrian or bicyclist that extends at least partially along a road network comprised of a plurality of road segments. The route of the pedestrian or bicyclist identifies one or more road segments included in the route and a time at which the pedestrian or bicyclist will proceed along the one or more road segments. Based upon the route of the pedestrian or the bicyclist, the computer-executable program code instructions also include program code instructions to control at least a portion of the road network infrastructure including the one or more traffic control elements such that the one or more traffic control elements permit the pedestrian or the bicyclist to proceed unimpeded along at least a portion of the route.

The computer-executable program code instructions also include program code instructions to receive location information regarding a location of the pedestrian or the bicyclist along the route. In this example embodiment, the program code instructions to control at least a portion of the road network infrastructure include program code instructions to control at least a portion of the road network infrastructure including the one or more traffic control elements based upon the location information. In an example embodiment, the computer-executable program code instructions also include program code instructions to receive information indicating a number of pedestrians or bicyclists who will proceed along the route. In this example embodiment, the program code instructions to control at least a portion of the road network infrastructure include program code instructions to control at least a portion of the road network infrastructure including the one or more traffic control elements in a manner that is dependent upon the number of pedestrians or bicyclists satisfying a threshold.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided for facilitating movement of a pedestrian, such as a runner or a walker, or a bicyclist, along a route. In an example embodiment, a method, apparatus and computer program product are provided for synchronizing routes of one or more autonomous vehicles and of a pedestrian or bicyclist. Autonomous vehicles may include fully autonomous vehicles that provide driverless vehicle capability where all vehicle functions are provided by software and hardware to safely drive the vehicle along a path identified by the vehicle. Autonomous vehicles may also include semi-autonomous vehicle control that may provide any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, locating signs and identifying information communicated by the sign, or any boundary related details of the road links that may be traversed by the vehicle.

Figure 1:
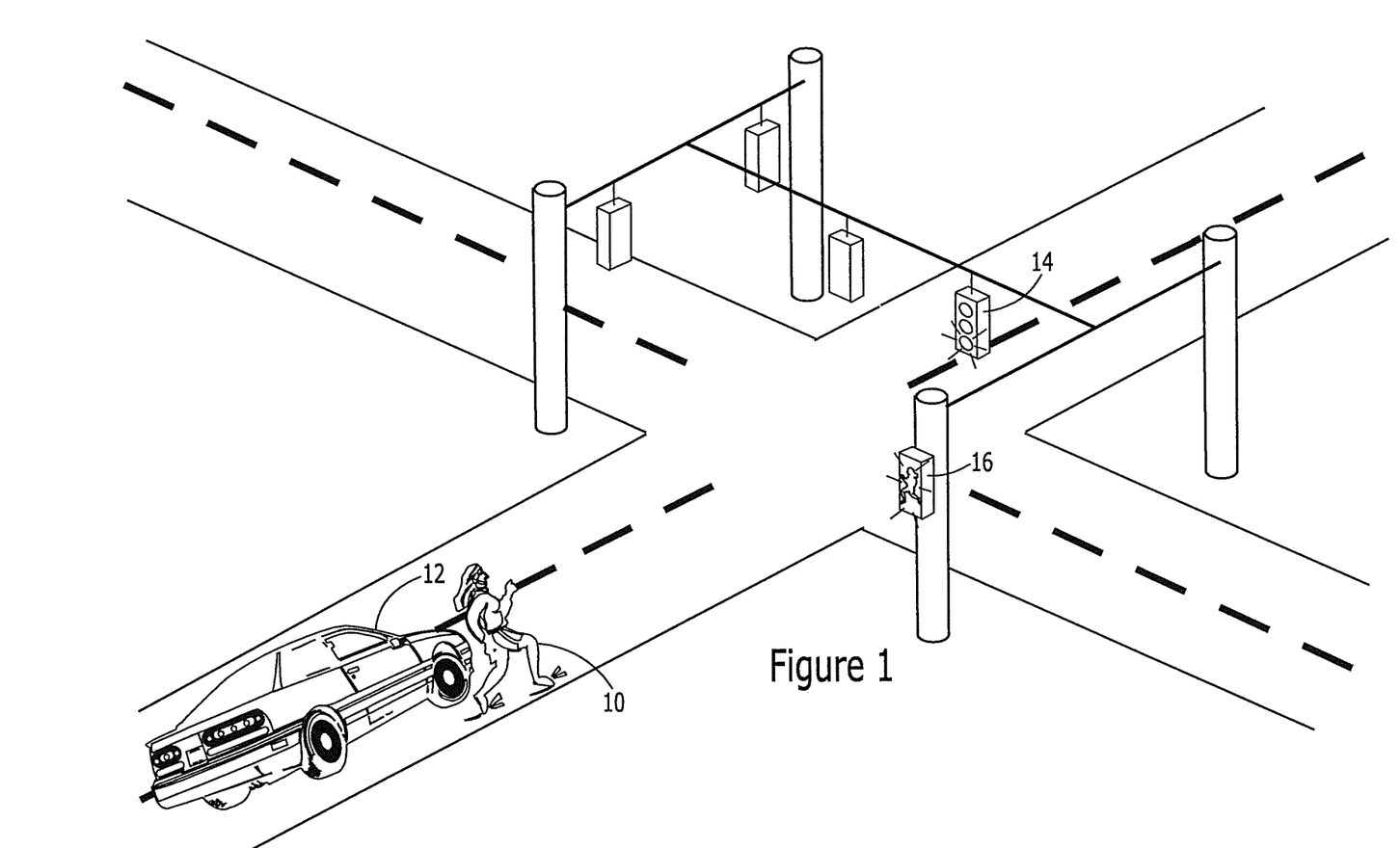
FIG. 1 is a perspective view of a pedestrian whose route is synchronized with the route of an autonomous vehicle that serves to protect the pedestrian in accordance with an example embodiment of the present disclosure.

As a result of the synchronization of the routes of one or more autonomous vehicles and of a pedestrian or bicyclist, the one or more autonomous vehicles may drive alongside the pedestrian or bicyclist while the pedestrian or bicyclist proceeds along at least a portion of the route. The one or more autonomous vehicles serve to guard the pedestrian or bicyclist from the hazards the pedestrian or bicyclist might otherwise encounter, such as encroachment from other motorized vehicles with which the pedestrian or bicyclist shares the road. As shown in FIG. 1, for example, a pedestrian 10 proceeds along a route which takes the pedestrian along a road segment that does not have a sidewalk or a bicycle lane. As such, the pedestrian shares the roadway with motorized vehicles. In accordance with an example embodiment, an autonomous vehicle 12 that has a route that is synchronized with the route of the pedestrian or bicyclist drives alongside the pedestrian while the pedestrian runs or walks along the roadway. As such, the autonomous vehicle guards the pedestrian while the pedestrian is proceeding along at least this portion of the route. By guarding the pedestrian, other motorized vehicles proceeding along the same roadway will be prevented from passing too closely to the pedestrian or otherwise impairing the pedestrian's progress along the route.

In another example embodiment, a method, apparatus and computer program product are provided for coordinating one or more traffic control elements, such as road signs, crosswalk signals or traffic lights, of a road network infrastructure with the route of a pedestrian or bicyclist. By coordinating the one or more traffic control elements, the pedestrian or bicyclist is permitted to proceed unimpeded along at least a portion of the route. In this regard, the one or more traffic control elements are coordinated so as to allow the pedestrian or bicyclist to proceed in the direction along which the route of the pedestrian or bicyclist takes the pedestrian or bicyclist, while signaling for cross traffic or other traffic that might impede the progress of the pedestrian or bicyclist to stop. As shown in FIG. 1, for example, the traffic light 14 and the crosswalk signal 16 have been coordinated with the route of the pedestrian 10 such that the pedestrian would be signaled to proceed across the upcoming intersection in an uninterrupted fashion, while cross traffic is signaled to stop.

Figure 2:
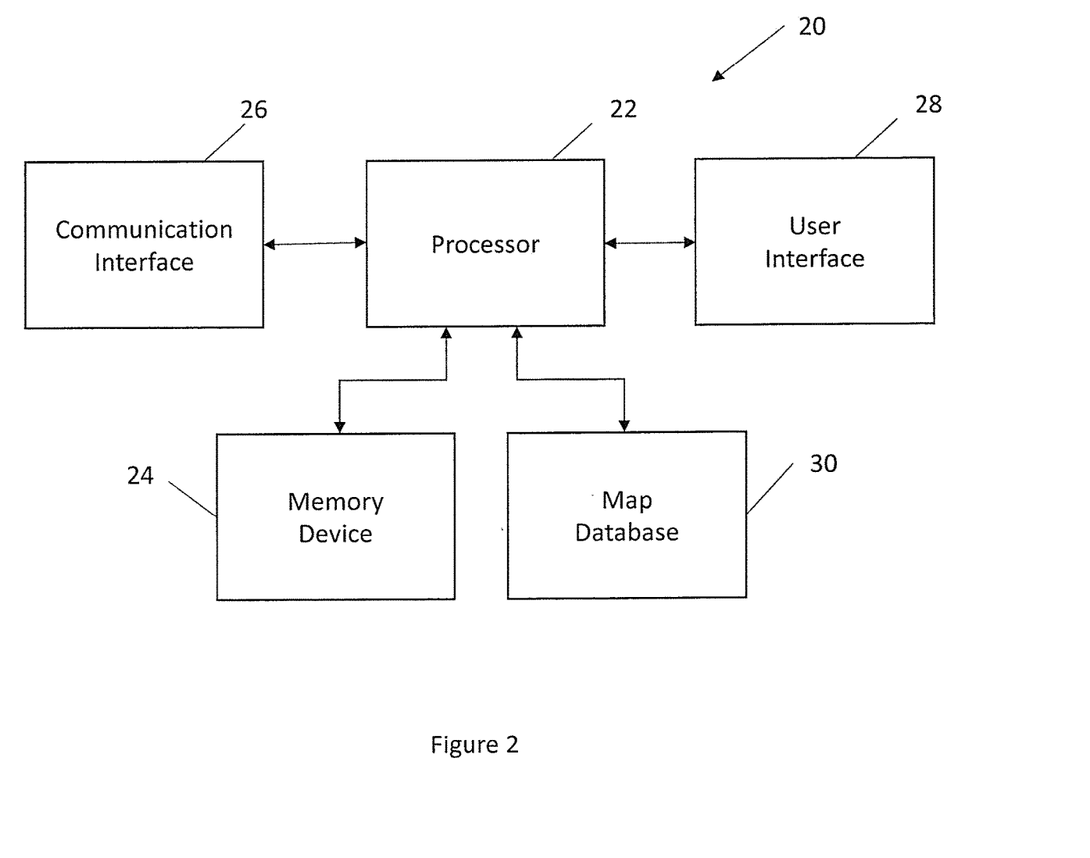
FIG. 2 is a block diagram of an apparatus specifically configured in accordance with an example embodiment of the present disclosure.

Referring now to FIG. 2, an apparatus 20 is depicted that may be specifically configured in order to synchronize the routes of one or more autonomous vehicles 12 and of a pedestrian 10 or bicyclist and/or to coordinate one or more traffic control elements with the route of the pedestrian or bicyclist. The apparatus may be embodied in any of a wide variety of computing devices. For example, the apparatus may be embodied by a server and/or cloud system, such as a computer services platform, e.g. a mapping or navigation services platform, that receives, stores and/or analyses a variety of data, such a map data, traffic data, weather data, data regarding the autonomous vehicles and/or data provided by other devices, such as devices carried by motorized vehicles, pedestrians and/or bicyclists. The data may be analyzed so as to perform various services including, for example, defining routes for autonomous vehicles and/or routes for pedestrians or bicyclists and/or for providing navigation services, such as the control of the one or more autonomous vehicles. Alternatively, the apparatus may be embodied by a computer associated with the pedestrian or bicyclist, such as carried by the pedestrian or bicyclist. In this regard, the computer may be a mobile device, such as a personal digital assistant (PDA), mobile telephone, smart phone, personal navigation device, wearable device, smart watch, tablet computer or the like, or a fixed computing device, such as a computer workstation, a navigation system or the like. In other embodiments, the apparatus of an example embodiment relating to the coordination of one or more traffic control elements of a road network infrastructure may be embodied by the computer network, such as the road network infrastructure platform of the governmental entity or other coordinating authority responsible for the road network infrastructure.

Regardless of the manner in which the apparatus 20 is embodied, the apparatus of an example embodiment includes, is associated with or is otherwise in communication with a processor 22, a memory device 24, a communication interface 26 and optionally a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus, such as via near field communication (NFC) or other proximity-based communication techniques. Additionally or alternatively, the communication interface may be configured to communicate over any of various wireless communication protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

The apparatus 20 of an example embodiment may also include or otherwise be in communication with a user interface 28. The user interface may include a touch screen display, a speaker, physical buttons, and/or other input/output mechanisms. In an example embodiment, the processor 30 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

In an example embodiment, the apparatus 20 optionally includes, is associated with or is otherwise in communication with a map database 30. The map database represents road segments in a geographic area. In this regard, the map database contains map data that indicates attributes of the road segments. The map database may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent bicycle lanes, pedestrian paths, sidewalks or other types of pedestrian segments as well as open areas or parks in addition to the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 30 of an example embodiment also includes information regarding traffic control elements of a road network infrastructure. The traffic control elements may include road signs, such as controllable road signs having a display that is variable, traffic lights and crosswalk signals. The information regarding the traffic control elements may include the location of the traffic control elements and information regarding the schedule according to which the traffic control elements operate, such as the timing of the traffic control elements.

The map database 30 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation. In this regard, the map database 30 includes map data and other information from which the routes of autonomous vehicles 12 and of a pedestrian 10 or bicyclist may be defined. Once defined, the routes of autonomous vehicles and of a pedestrian or bicyclist may be stored, such as by the map database.

As mentioned above, the map database 30 may be a master geographic database, but in alternate or complementary embodiments, a client side map database may represent a compiled navigation database that may be used in or with end user devices to provide navigation and/or map-related functions. In such a case, the map database can be downloaded or stored on the end user device which can access the map database through a wireless or wired connection, such as a communications network.

Figure 3:
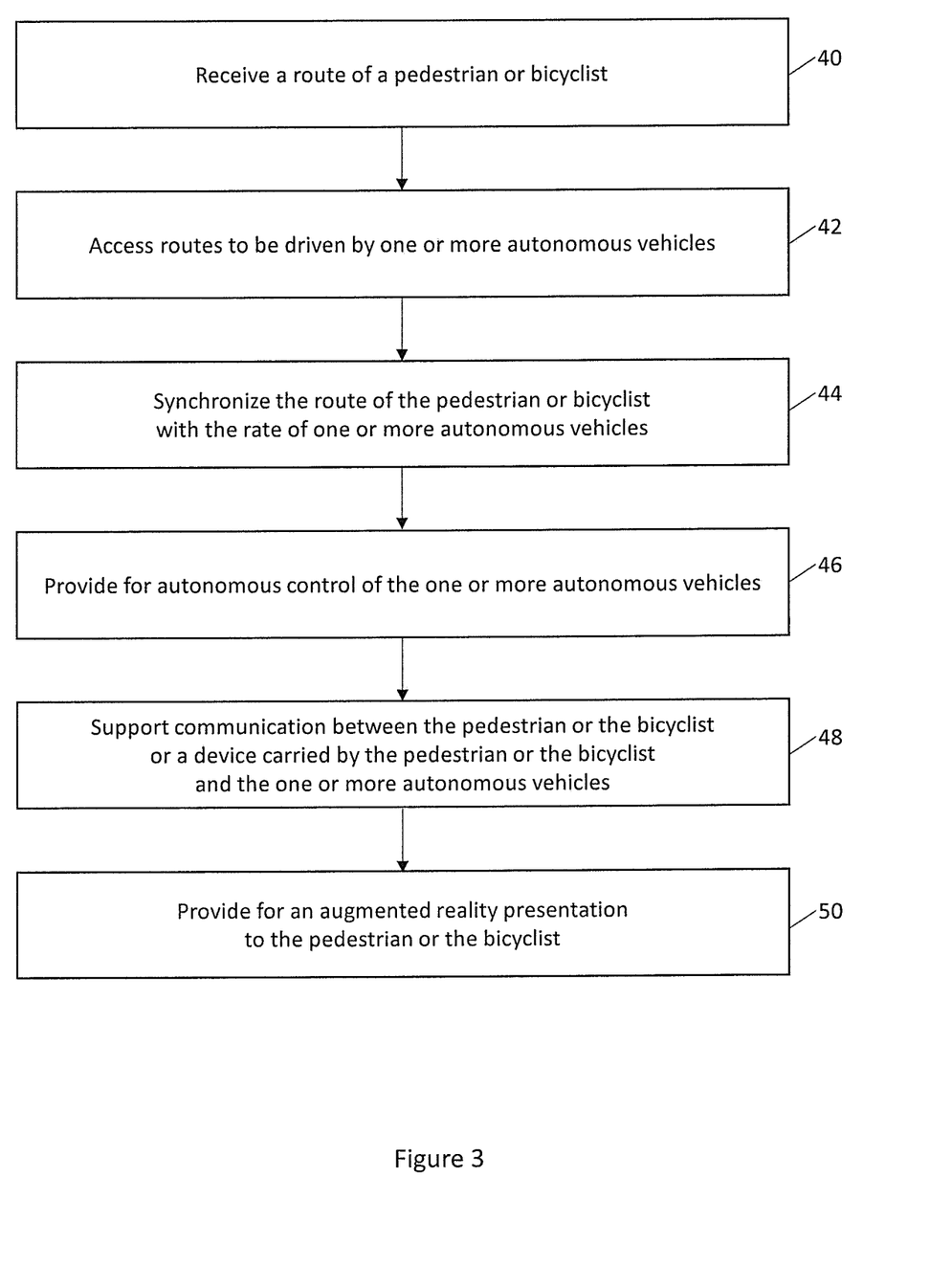
FIG. 3 is a flow chart illustrating operations performed, such as by the apparatus of FIG. 2, in order to synchronize the routes of one or more autonomous vehicles and of a pedestrian or bicyclist in accordance with an example embodiment of the present disclosure.

Referring now to FIG. 3, the operations performed in order to synchronize the routes of one or more autonomous vehicles 12 and of a pedestrian 10 or bicyclist are depicted. As shown in block 40 of FIG. 3, the apparatus 20 includes means, such as the processor 22, the communication interface 26 or the like, for receiving a route of the pedestrian or bicyclist that extends at least partially along a road network comprised of a plurality of road segments. In some embodiments, the route of the pedestrian or bicyclist may have been previously defined, such as by computer services platform, such as a mapping or navigation services platform, and may be stored, such as either by the mapping or navigation services platform or by a device, such as a mobile device, carried by the pedestrian or bicyclist. In these embodiments, information defining the route including the origin and the destination as well as the sequence of road segments to be followed to lead from the origin to the destination may be provided to and received by the apparatus. In some embodiments, the route of the pedestrian or bicyclist may also include information regarding the starting time at which the pedestrian or bicyclist will commence the route and/or the anticipated pace at which the pedestrian or bicyclist plans to proceed along the route.

In other embodiments, the apparatus 20, such as the processor 22, is configured to receive the route of the pedestrian 10 or bicyclist by receiving information, such as from the pedestrian or bicyclist, regarding the origin and destination, and, in some embodiments, the time at which the pedestrian or bicyclist will start the route and/or the pace at which the pedestrian or bicyclist will proceed along the route, but without including the sequence of road segments that will comprise the route. In these embodiments, the apparatus, such as the processor, will then proceed to define the route. Once defined, the apparatus, such as the processor, the communication interface 26 or the like, may provide the resulting route to the pedestrian or bicyclist, such as to a device associated with or carried by the pedestrian or bicyclist for subsequent reference. In defining the route, the apparatus, such as the processor, of an example embodiment is configured to access the map database 30 and to identify a sequence of road segments that proceed from the origin to the destination. In conjunction with the definition of the sequence of road segments that will comprise the route, the apparatus, such as the processor, is configured to take into account various attributes of the road segments including, for example, the posted speed limit along the road segments, whether the road segments have sidewalks or bicycle lanes, the width of the road segments and the like. In addition to road segments, the route that is defined may also include one or more green spaces or other pedestrian regions, such as parks, plazas, pedestrian or bicycle trails or the like.

As shown in block 42 of FIG. 3, the apparatus 20 of an example embodiment also includes means, such as the processor 22, the memory device 24 or the like, for accessing routes to be driven by one or more autonomous vehicles 12. Depending upon the manner in which the apparatus is embodied, the apparatus may include and have stored information regarding the routes of one or more autonomous vehicles, such as in an instance in which the apparatus is embodied by computer services platform, such as a mapping or navigation services platform, that facilitates control of the autonomous vehicles. Alternatively, the apparatus, such as the processor, the communication interface 26 or the like, may be configured to communicate with a computer services platform, such as a mapping services or navigation services platform, configured to facilitate control of the autonomous vehicles in order to obtain information regarding the routes of the autonomous vehicles. The routes of the autonomous vehicles generally define the origin and destination of the route and a sequence of road segments that proceeds from the origin to the destination and that will be taken by the autonomous vehicle. The information relating to the routes of the autonomous vehicles may also include information regarding the time at which the autonomous vehicle will commence the route and, in some embodiments, the time at which the autonomous vehicle will complete the route. Additionally, information regarding the speed at which the autonomous vehicle will proceed along the route may be provided and optionally, information regarding the time at which the autonomous vehicle will reach various waypoints along the route.

In accordance with an example embodiment, and as shown in block 44 of FIG. 3, the apparatus 20 of this example embodiment include means, such as a processor 22 or the like, for synchronizing the route of the pedestrian 10 or bicyclist with the route of the one or more autonomous vehicles 12. As a result of the synchronization, the routes of the one or more autonomous vehicles and of the pedestrian or bicyclist therefore include one or more of the same road segments and are temporarily synchronized such that the one or more autonomous vehicles and the pedestrian or bicyclist proceed along those same one or more road segments during the same period of time. By synchronizing the routes, one or more of the autonomous vehicles will drive alongside the pedestrian or bicyclist while the pedestrian or bicyclist proceeds along at least a portion of the route. In this regard, the autonomous vehicle may drive alongside the pedestrian or bicyclist during the entire route or during only a portion of the route, such as that portion of the route in which the pedestrian or bicyclist does not have a sidewalk or bicycle lane that can be utilized and, instead, must share the roadway with motorized vehicles. As shown in FIG. 1, an autonomous vehicle that drives alongside the pedestrian or bicyclist may be positioned laterally adjacent to the pedestrian or bicyclist, but spaced apart therefrom by a predetermined distance, such as five to ten feet. Alternatively, the autonomous vehicle may drive alongside the pedestrian or bicyclist by being similarly laterally spaced from the pedestrian or bicyclist but being somewhat rearward of or forward of the pedestrian or bicyclist. By driving alongside the pedestrian or bicyclist, the autonomous vehicle protects the pedestrian or bicyclist from other motorized vehicles that might otherwise encroach too closely to the pedestrian or bicyclist or otherwise impede the progress of the pedestrian or bicyclist along the route.

The autonomous control of the one or more autonomous vehicles 12 may be provided by a computer services platform, such as a mapping services or navigation services platform, that is distinct from, but in communication with the apparatus 20 of an example of the present disclosure. However, the apparatus of another example embodiment optionally includes means, such as the processor 22 or the like, for providing for autonomous control of the one or more autonomous vehicles so as to drive alongside the pedestrian 10 or bicyclist while the pedestrian or bicyclist proceeds along at least a portion of the route. See block 46 of FIG. 3. Thus, the apparatus, such as the processor, of this example embodiment not only synchronizes the routes of the one or more autonomous vehicles and of the pedestrian or bicyclist, but also provides for the control of the one or more autonomous vehicles so as to bring the synchronization of the routes into practice such that the one or more autonomous vehicles drive alongside the pedestrian or bicyclist during at least a portion of the route.

In relation to synchronizing the route of the pedestrian 10 or bicyclist with the route of the one or more autonomous vehicles 12, the apparatus 20 of an example embodiment includes means, such as the processor 22 or the like, for analyzing the routes of a plurality of autonomous vehicles to identify the route of the one or more autonomous vehicle that corresponds to the route of the pedestrian or bicyclist. In relation to the correspondence of the routes of the one or more autonomous vehicles and the route of the pedestrian or bicyclist, the correspondence between the routes is in terms of one or more road segments included in the routes of the one or more autonomous vehicles and of the pedestrian or bicyclist and the time at which the one or more autonomous vehicles and the pedestrian or bicyclist will proceed along the same one or more road segments.

In some embodiments, such as in instances in which the routes of the plurality of autonomous vehicles 12 and the route of the pedestrian 10 or bicyclist do not correspond, such as by not sharing the same road segment during the same period of time, the apparatus 20 of an example embodiment includes means, such as the processor 22 or the like, for synchronizing the route of the pedestrian or bicyclist with the route of the one or more autonomous vehicles by modifying one or more road segments included in the route of the pedestrian or bicyclist and/or the time at which the pedestrian or bicyclist will proceed along the one or more road segments in order to bring the route of the pedestrian or bicyclist into correspondence to the route of the one or more autonomous vehicles. In this regard, the route of the pedestrian or bicyclist may be modified and following the modification may correspond and be capable of being synchronized with the route of one or more of the autonomous vehicles since the route of the pedestrian or bicyclist, as modified, will include one or more road segments in common with the route of one or more autonomous vehicles with the pedestrian or bicyclist scheduled to proceed along the one or more road segments during the same period of time as the one or more autonomous vehicles. In many instances and particularly as the number of autonomous vehicles increases, the route of the pedestrian or bicyclist need not be modified in a substantial manner, but may, for example, be modified so as to take a different one of a plurality of parallel road segments that extend between the same end points so as to be synchronized with the route of an autonomous vehicle that will proceed along the different one of the parallel road segments.

Additionally or alternatively, the starting time at which the pedestrian 10 or bicyclist will proceed along the route may be modified, such as by being moved up 15 minutes or moved back 15 minutes, such that the time at which the pedestrian or bicyclist is anticipated to reach a respective road segment is synchronized with the time at which an autonomous vehicle 12 is anticipated to be driving along the same road segment. In an example embodiment, the apparatus 20, such as the processor 22, the communication interface 26, user interface 28 or the like, may be configured to advise the pedestrian or bicyclist of the suggested modification to the route and may only adopt the modification following agreement by the pedestrian or bicyclist, such as via the user interface, as to the proposed modification.

Additionally or alternatively, the apparatus 20 of an example embodiment includes means, such as the processor 22 or the like, for synchronizing the route of the pedestrian 10 or bicyclist with the route of the one or more autonomous vehicles 12 by modifying one or more road segments included in the route of the one or more autonomous vehicles and/or the time at which the one or more autonomous vehicles will proceed along the one or more road segments in order to correspond to the route of the pedestrian or bicyclist. In this regard, the route of the one or more autonomous vehicles may be modified and following the modification may correspond and be capable of being synchronized with the route of the pedestrian or bicyclist since the route of the one or more autonomous vehicles, as modified, will include one or more road segments in common with the route of pedestrian or bicyclist with the one or more autonomous vehicles scheduled to proceed along the one or more road segments during the same period of time as the pedestrian or bicyclist. As noted before, the route of the one or more autonomous vehicles need not be modified in a substantial manner, but may, for example, be modified so as to take a different one of a plurality of parallel road segments that extend between the same end points so as to be synchronized with the route of a pedestrian or bicyclist who will proceed along the different one of the parallel road segments. Additionally or alternatively, the starting time at which the one or more autonomous vehicles will drive along the route may be modified, such as by being moved up 15 minutes or moved back 15 minutes, such that the time at which the one or more autonomous vehicles is anticipated to reach a respective road segment is synchronized with the time at which the pedestrian or bicyclist is anticipated to be proceeding along the same road segment.

In an example embodiment, the route of the pedestrian 10 or bicyclist may be synchronized not only with the route of a single autonomous vehicle 12, but with the routes of two or more autonomous vehicles. In this example embodiment, different ones of the autonomous vehicles generally drive alongside the pedestrian or bicyclist as the pedestrian or bicyclist proceeds along different portions of the route, such as along different road segments. Thus, each autonomous vehicle may proceed along its own distinct route and may serve to guard the pedestrian or bicyclist during the portion of the route that coincides with the route of the pedestrian or bicyclist with other autonomous vehicles driving alongside the pedestrian or bicyclist during other portions of the route of the pedestrian or bicyclist as a result of the correspondence between the other portions of the route of the pedestrian or bicyclist and portions of the routes of the other autonomous vehicles. By utilizing a plurality of autonomous vehicles to guard the pedestrian or bicyclist during different portions of the route, each autonomous vehicle may proceed along its own distinct route, but may also provide protection for the pedestrian or bicyclist along different portions of the route of the pedestrian or bicyclist, thereby cumulatively offering more extensive protection to the pedestrian or bicyclist while avoiding or reducing modifications to the routes to be taken by the autonomous vehicles.

Figure 4:
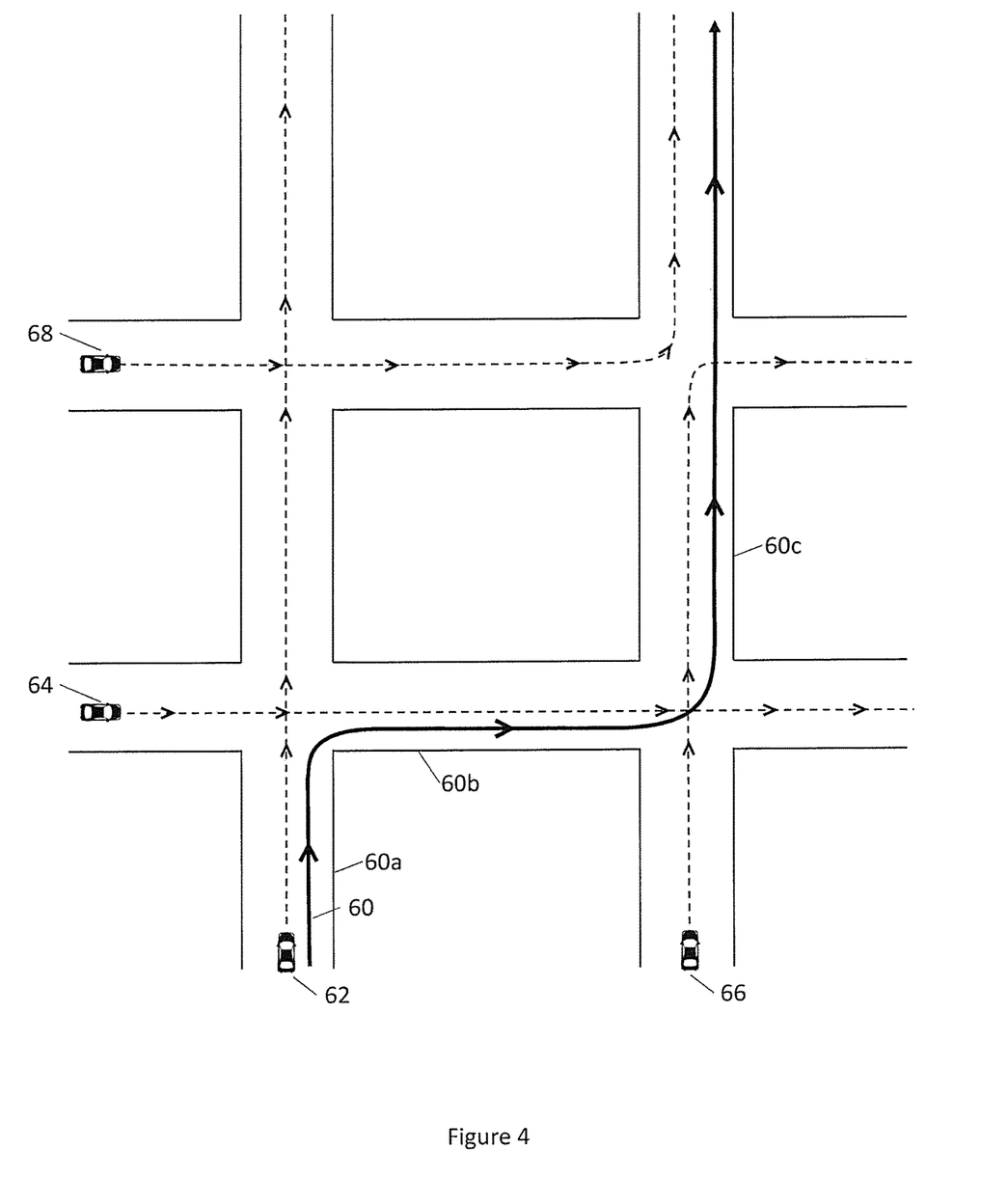
FIG. 4 is a graphical representation of the routes of one or more autonomous vehicles and of a pedestrian or bicyclist so as to depict the synchronization of the routes in accordance with an example embodiment of the present disclosure.

In this example embodiment, the apparatus 20 includes means, such as the processor 22 or the like, for synchronizing a first portion of the route of the pedestrian 10 or bicyclist with the route of a first autonomous vehicle and means, such as the processor or the like, for synchronizing a second portion of the route of the pedestrian or bicyclist with the route of a second autonomous vehicle. Referring now to FIG. 4, an overview of a route 60 of a pedestrian or bicyclist is depicted. The route begins at an origin and proceeds along a sequence of road segments until reaching a destination with an intermediate portion of the route shown in FIG. 4. As also shown by FIG. 4, the routes of a plurality of autonomous vehicles correspond to different portions of the route of the pedestrian or bicyclist by proceeding along the same portion of the route of the pedestrian or bicyclist at the same time at which the pedestrian or bicyclist is proceeding therealong. As such, a first autonomous vehicle 62 drives alongside the pedestrian or bicyclist during a first portion of the route, that is, along road segment 60a. The route of the first autonomous vehicle then causes the first autonomous vehicle to proceed in a straight direction and to deviate from the route of the pedestrian or bicyclist, which takes a right turn. However, a second autonomous vehicle 64 has a route that comes into correspondence with the route of the pedestrian or bicyclist along a second road segment 60b such that the second autonomous vehicle then drives alongside the pedestrian or bicyclist while the pedestrian or bicyclist proceeds along the second road segment. At next intersection, the route of the pedestrian or bicyclist then takes the pedestrian or bicyclist to the left along a different road segment while the route of the second autonomous vehicle causes the second autonomous vehicle to continue in a straight direction. However, the route of a third autonomous vehicle 66 corresponds to that portion of the route of the pedestrian or bicyclist after the pedestrian or bicyclist has taken the left onto the third road segment 60c such that the third autonomous vehicle then drives alongside the pedestrian or bicyclist while the pedestrian or bicyclist proceeds along an initial portion of the third road segment.

The route of the third autonomous vehicle 66 then turns to the right at the next intersection with the route 60 of the pedestrian or bicyclist proceeding in a straight direction along the third road segment 60c. However, a fourth autonomous vehicle 68 turns onto the third road segment such that the route of the fourth autonomous vehicle corresponds with the route of the pedestrian or bicyclist along a subsequent portion of the third road segment. As such, the first, second, third and fourth autonomous vehicles of this example embodiment collectively provide protection or coverage for the pedestrian or bicyclist while the pedestrian or bicyclist proceeds along the route and the first, second, third and fourth autonomous vehicles continue to proceed along their respective routes.

In accordance with an example embodiment and as shown in block 48 of FIG. 3, the apparatus 20 also optionally includes means, such as the processor 22, the communication interface 26 or the like, for supporting communication or other dynamic interaction between the pedestrian 10 or bicyclist or a device, such as the various mobile devices described above, carried by the pedestrian or bicyclist and the one or more autonomous vehicles 12 while the one or more autonomous vehicles drive alongside the pedestrian or bicyclist. This communication may be provided by NFC or other proximity-based communication techniques or may be supported by any of a variety of different wireless communication techniques including cellular communication or the like. The subject of the communication may be varied. For example, the communications may identify the pedestrian or bicyclist to the autonomous vehicle and/or may identify the autonomous vehicle to the pedestrian or bicyclist such that both the pedestrian or bicyclist and the autonomous vehicle can confirm that the autonomous vehicle and the pedestrian or bicyclist are those whose routes have been synchronized during at least this portion of the route of the pedestrian or bicyclist. As a sign of confirmation that the autonomous vehicle that is driving alongside the pedestrian or bicyclist is the autonomous vehicle having a route that has been synchronized with the route of the pedestrian or bicyclist, the autonomous vehicle of an example embodiment may be caused, such as by the apparatus, e.g., the processor, the communication interface or the like, to blink its lights, honk its horn or otherwise perform a predefined action that alerts the pedestrian or bicyclist that the autonomous vehicle has a route that has been synchronized with the route of the pedestrian or bicyclist. In other embodiments, the communication between the pedestrian or bicyclist and the autonomous vehicle may provide information regarding an incidents and/or unexpected obstacle along the route to permit the pedestrian or bicyclist or the autonomous vehicle or both to avoid the incident and/or unexpected obstacle, such as by rerouting.

Additionally or alternatively, the pedestrian 10 or bicyclist may communicate with the autonomous vehicle 12 in order to advise the autonomous vehicle of a change in the route of the pedestrian or bicyclist. In this regard, the pedestrian or bicyclist may provide input via the user interface of the device carried by the pedestrian or bicyclist with the user input provided to the apparatus 20. The user input may identify a change in the route of the pedestrian or bicyclist and the apparatus, such as the processor 22, the communication interface 26 or the like, may then advise the autonomous vehicle of the change in route. As a result of the change in route, the autonomous vehicle may proceed alongside the pedestrian or bicyclist following the change in route if the route of the autonomous vehicle also corresponds to the modified route of the pedestrian or bicyclist. Alternatively, if the route of the autonomous vehicle does not correspond to the modified route provided by the pedestrian or bicyclist, the autonomous vehicle may no longer drive alongside the pedestrian or bicyclist after the pedestrian or bicyclist has proceeded along that portion of the route that has been changed and, instead, the apparatus, such as the processor, may identify another autonomous vehicle having a route that corresponds to that portion of the route of the pedestrian or bicyclist that has been modified such that the other autonomous vehicle may then drive alongside the pedestrian or bicyclist after the pedestrian or bicyclist has commenced that portion of the route that has been modified. Although the user input may be provided via a device, such as a mobile device, carried by the pedestrian or bicyclist, the user input may be provided in other manners. For example, the user may provide one or more predefined gestures or facial expressions that are recognized by the apparatus, such as the user interface 28 or other sensor, and/or by the autonomous vehicle with the predefined gestures or facial expressions providing input and instruction.

In addition to communicating with the pedestrian or bicyclist, the autonomous vehicle 12 that serves to guard the pedestrian 10 or bicyclist may include one or more sensors. The one or more sensors, such as proximity sensors, distance sensors or the like, e.g., an image sensor, a LiDAR (Light Distancing and Ranging) sensor, radar or the like, may determine the relative position of the pedestrian or bicyclist with respect to the autonomous vehicle and/or the distance between the autonomous vehicle and the pedestrian or bicyclist. Based upon the parameters detected by the one or more sensors, the autonomous vehicle may be controlled, such as by the apparatus 20, e.g., the processor 22, or by a computer services platform, such as a mapping or navigation services platform, such that the autonomous vehicle remains a predefined distance from the pedestrian or bicyclist so as to offer protection from other motorized vehicles without too closely encroaching upon the pedestrian or bicyclist.

During the traversal of the routes, such as once the pedestrian 10 or bicyclist and the autonomous vehicle 12 whose routes have been synchronized are proceeding along the portion of the road segment during which the autonomous vehicles is to drive alongside the pedestrian or bicyclist, the current locations of the pedestrian or bicyclist and/or the autonomous vehicle may be determined, such as based upon location information provided by location sensors, such as a global positioning system (GPS), carried by the pedestrian or bicyclist and also by the autonomous vehicle. As a result of the location information, the apparatus 20, such as the processor 22, the communication interface 26 or the like, may provide further instructions to one or both of the autonomous vehicle and the pedestrian or bicyclist in order to more closely align the autonomous vehicle with the pedestrian or bicyclist. In this regard, the apparatus, such as the processor, may issue instructions to the autonomous vehicle to speed up or slow down slightly for a limited period of time in order to bring the autonomous vehicle into closer alignment with the pedestrian or bicyclist.

Figure 5:
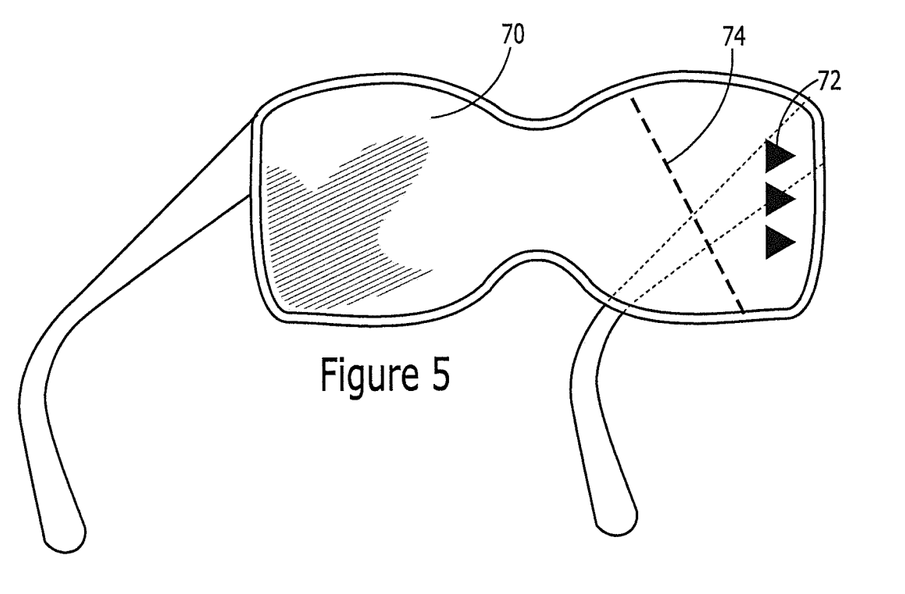
FIG. 5 illustrates an augmented reality presentation that is provided to a pedestrian or bicyclist in accordance with an example embodiment of the present disclosure.

The apparatus 20 of an example embodiment also, as shown in block 50 of FIG. 3, optionally includes means, such as the processor 22, the communication interface 26, the user interface 28 or the like, for providing for an augmented reality presentation to the pedestrian 10 or bicyclist in order to provide an indication of the one or more autonomous vehicles 12 that drive alongside the pedestrian or bicyclist and/or an indication of the virtual lane established for the pedestrian or bicyclist by the one or more autonomous vehicles that drive alongside the pedestrian or bicyclist. In this regard, the pedestrian or bicyclist may don augmented reality glasses 70 as shown in FIG. 5 or may be wearing a helmet including a visor that supports an augmented reality presentation. Once an autonomous vehicle has moved into position alongside the pedestrian or bicyclist, the augmented reality presentation may be controlled so as to provide an indication to the pedestrian or bicyclist that the vehicle driving alongside the pedestrian or bicyclist is an autonomous vehicle having a route that has been synchronized with the route of the pedestrian or bicyclist. This indication may be provided in many forms including, for example, an arrow or other insignia 72 on the side of the augmented reality presentation closest to the autonomous vehicle and indicative of the presence of an autonomous vehicle. Additionally or alternatively, the augmented reality presentation may provide an indication 74 of a virtual lane that is being created for the pedestrian or bicyclist by the one or more autonomous vehicles that drive alongside. This virtual lane defines that region in which the pedestrian or bicyclist can proceed unimpeded by other motorized vehicles as a result of the protection offered by the one or more autonomous vehicles. The indication of a virtual lane is provided by the augmented reality presentation, but is not visible to others along the road segment. Additional or different information may be provided by the augmented reality presentation including, for example, information regarding the time or location at which the routes of the autonomous vehicle and the pedestrian or bicyclist will deviate such that the autonomous vehicle will no longer be driving alongside the pedestrian or bicyclist and/or information regarding the location and/or time at which another autonomous vehicle will begin driving alongside the pedestrian or bicyclist.

In some embodiments, the apparatus 20 includes means, such as the processor 22, the communication interface 26 or the like, for advising the pedestrian 10 or bicyclist or the device carried by the pedestrian or bicyclist that a vehicle proximate with the pedestrian or bicyclist is not an autonomous vehicle having a route that has been synchronized with the route of the pedestrian or bicyclist. For example, the apparatus, such as an apparatus embodied by a device carried by the pedestrian or bicyclist, may include, be associated with or be in communication with one or more sensors configured to detect the presence of a vehicle proximate the pedestrian or bicycle. The apparatus, such as the processor, of this example embodiment can identify whether the vehicle is, or is not, an autonomous vehicle whose route is synchronized with the route of the pedestrian or bicyclist, such as by communicating or attempting to communicate with the vehicle as described above or based upon a comparison of the routes of the autonomous vehicles that were previously accessed in block 42 of FIG. 3 to the route of the pedestrian or bicyclist. Upon detecting a vehicle proximate with the pedestrian or bicyclist that is not an autonomous vehicle having a route that has been synchronized with the route of the pedestrian or bicyclist, the pedestrian or bicyclist may alter the route or may delay along the route in order to permit the other vehicle to proceed and to obtain separation from the other vehicle.

Alternatively, the apparatus 20 of this example embodiment, such as the processor 22 or the like, may communicate with the vehicle, such as in an instance in which the vehicle is an autonomous vehicle in order to determine the route of the vehicle. In an instance in which the route of the vehicle coincides with at least a portion of the route of the pedestrian 10 or bicyclist, particularly a portion of the route of the pedestrian or bicyclist that has not been previously synchronized with the route of another autonomous vehicle 12, the apparatus, such as the processor, the communication interface 26 or the like, may synchronize the routes of the additional vehicle and of the pedestrian or bicyclist such that the additional vehicle is added to the plurality of autonomous vehicles that serve to protect the pedestrian or bicyclist during different portions of the route of the pedestrian or bicyclist with the additional vehicle continuing drive alongside the pedestrian or bicyclist, albeit now in synchronization with the route of the pedestrian or bicyclist.

As described above, the movement of a pedestrian 10 or bicyclist along a route may be facilitated by having one or more autonomous vehicles 12 drive alongside the pedestrian or bicyclist during at least a portion of the route, thereby guarding the pedestrian or bicyclist relative to other motorized vehicles that might otherwise impede the progress of the pedestrian or bicyclist along the route. In an example embodiment, the movement of the pedestrian or bicyclist along the route may also be facilitated by coordinating one or more traffic control elements, such as one or more road signs, crosswalk signals, traffic lights or other controllable or reconfigurable traffic control elements, of a road network infrastructure with a route of a pedestrian or bicyclist. As shown in block 80 of FIG. 6, the apparatus 20 of this example embodiment includes means, such as the processor 22, the communication interface 26 or the like, for receiving a route of a pedestrian or bicyclist that extends at least partially along the road network comprised of a plurality of road segments. As described above, the route of the pedestrian or bicyclist identifies one or more road segments included in the route and the time at which the pedestrian or bicyclist will proceed along the one or more road segments.

Based upon the route of the pedestrian 10 or bicyclist, the apparatus 20 of this example embodiment includes means, such as the processor 22, the communication interface 26 or the like, for controlling at least a portion of the road network infrastructure including the one or more traffic control elements such that the one or more traffic control elements permit the pedestrian or bicyclist to proceed unimpeded along at least a portion of the route. See block 88 of FIG. 6. As shown in FIG. 1, for example, the traffic light 14 may be controlled so as to be green in the direction in which the pedestrian or bicyclist is proceeding at the time that the pedestrian or bicyclist reaches the intersection. Further, the crosswalk signal 16 at the intersection may correspondingly indicate that the pedestrian or bicyclist may proceed across the intersection at the time at which the pedestrian or bicyclist reaches the intersection. Additionally, the traffic control signals that control and direct the cross traffic, that is, the traffic that would otherwise proceed along the cross street, are similarly controlled in concert so as to direct that the cross traffic stop such that the pedestrian or bicyclist can proceed unimpeded through the intersection. FIG. 1 illustrates one example of traffic control elements. However, a road network infrastructure may include any of a wide variety of different traffic control elements, each of which may be individually controlled based upon the route of the pedestrian or bicyclist as described herein.

Typically, the traffic control elements are controlled as described in accordance with this example embodiment during the time period in which the pedestrian 10 or bicyclist is in proximity to the traffic control element and not when the pedestrian or bicyclist is remote from the traffic control element. Although timing information regarding when the pedestrian or bicyclist is anticipated to be proximate to a traffic control element may be provided in conjunction with the route of the pedestrian or bicyclist, this timing information may be refined as the pedestrian or bicyclist proceeds along the route. In this regard, the apparatus 20 includes means, such as the processor 22, the communication interface 26 or the like, for receiving location information regarding a location of the pedestrian or bicyclist along the route. See block 82 of FIG. 6. As such, the apparatus of this example embodiment also includes means, such as the processor, the communication interface or the like, for controlling at least a portion of the road network infrastructure in order to control the one or more traffic control elements based upon the location information, thereby fine tuning the timing information associated with the control of the traffic control elements. See block 88. Thus, the traffic control elements may be controlled so as to permit the pedestrian or bicyclist to proceed along the route in an unimpeded manner as the pedestrian or bicyclist approaches the traffic control elements, such as in an instance in which the pedestrian or bicyclist is within a predefined distance of the traffic control element, and not in an instance in which the pedestrian or bicyclist is more remote from the traffic control element, in which instance the traffic control element proceeds to operate in accordance with a standard schedule.

In some embodiments, the control of the traffic control elements of a road network infrastructure described in conjunction with this embodiment occurs during only selected periods of time, such as during off peak times in terms of traffic and traffic congestion, such as during the overnight hours, on weekends or the like. Additionally or alternatively, the control of the traffic control elements may only occur in instances in which at least a predefined number of pedestrians or bicyclists will proceed, such as in a group, along the route. Thus, in this example embodiment, the traffic control elements will not be controlled for a single pedestrian or bicyclist, but, instead, will be controlled if a sufficiently sizeable group of pedestrians or bicyclists are proceeding along the route. As such, the apparatus 20 of this example embodiment includes means, such as the processor 22, the communication interface 26 or the like, for receiving information indicating a number of pedestrians or bicyclists who will proceed along the route. See block 84 of FIG. 6. As such, the apparatus, such as the processor, of this example embodiment is configured to control at least a portion of the road network infrastructure including the one or more traffic control elements in a manner that is dependent upon the number of pedestrians or bicyclists satisfying a threshold, such as a predetermined threshold. See decision block 86. Thus, if a sufficient number of pedestrians or bicyclists will proceed along the route, the apparatus, such as the processor, of this example embodiment controls the traffic control elements such that the group of pedestrians or bicyclists may proceed along the route in an unimpeded manner. However, if one or a smaller number of pedestrians or bicyclists less than then threshold are planning to proceed along the route, the traffic control elements may continue to operate in accordance with their standard schedule and will not be particularly controlled in accordance with this example embodiment so as to not interrupt the traditional traffic flow.

As described above, a method, apparatus 20 and computer program product are provided in accordance to facilitate movement of a pedestrian 10 or bicyclist along a route. In an example embodiment, a method, apparatus and computer program product synchronize the routes of one or more autonomous vehicles and of a pedestrian or bicyclist such that the one or more autonomous vehicles drive alongside the pedestrian or bicyclist along at least a portion of a route in order to protect the pedestrian or bicyclist, particularly in instances in which the pedestrian or bicyclist must share the roadway with motorized vehicles. In another example embodiment, a method, apparatus and computer program product coordinate one or more traffic control elements of a road network infrastructure with a route of a pedestrian or bicyclist such that the pedestrian or bicyclist may proceed along the route in a more expeditious manner, thereby reducing the time required to complete the route and potentially increasing the health benefits attributable to running, walking or bicycling along the route.

Figure 6:
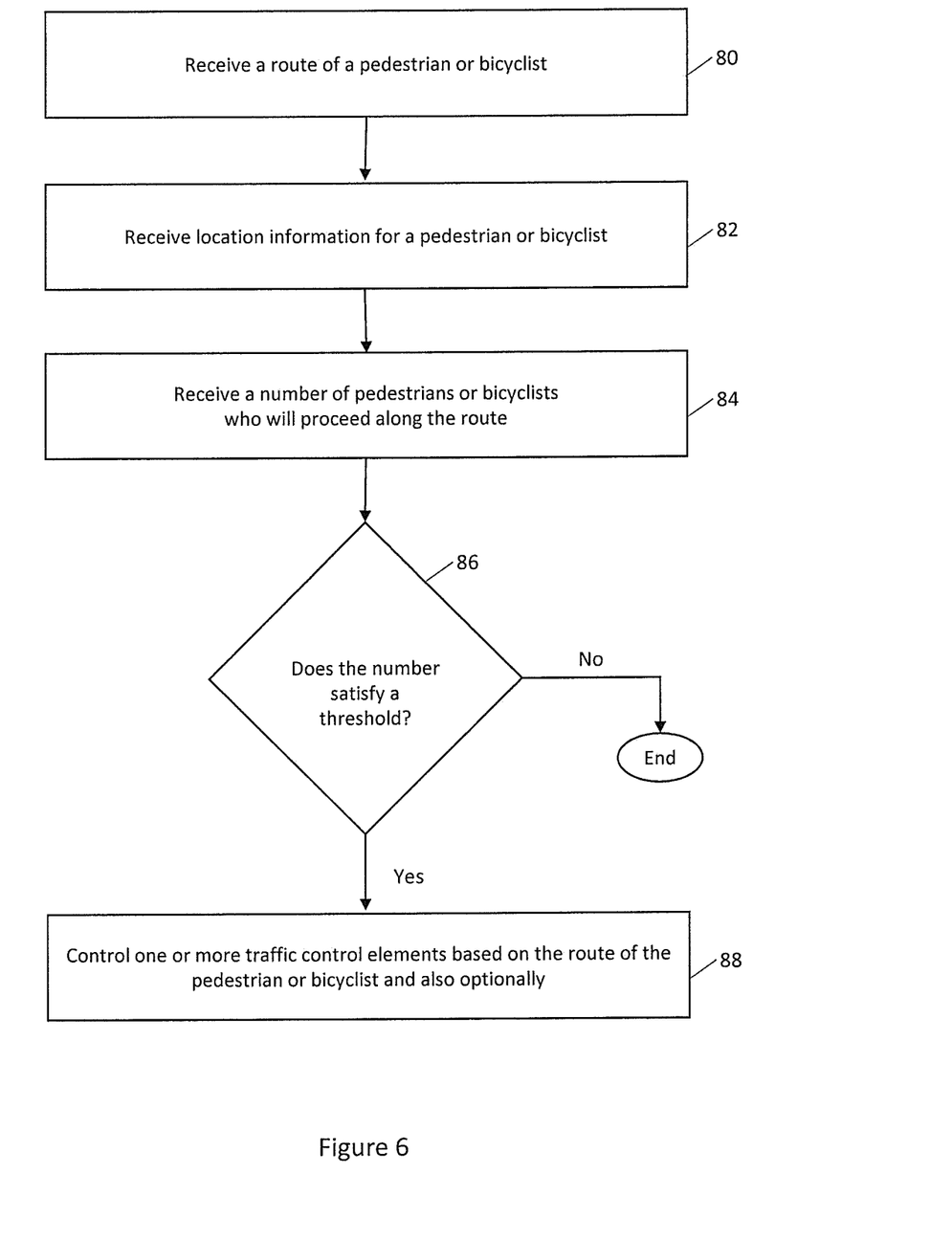
FIG. 6 is a flow chart illustrating operations performed, such as by the apparatus of FIG. 2, in order to coordinate one or more traffic control elements of a road network infrastructure with a route of a pedestrian or bicyclist in accordance with an example embodiment of the present disclosure.

FIGS. 3 and 6 illustrate flowcharts depicting methods according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 32 of an apparatus employing an embodiment of the present invention and executed by a processor 30. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although described in conjunction with pedestrians and bicyclists, the method and apparatus may also be utilized in conjunction with a wide variety of other types of specialized vehicles, such as motorized scooters (having a motor sized, such as at 50 cc, so as to be too small for conventional operation with motorized vehicles on the roadways), Segway personal transports or the like.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for synchronizing routes of one or more autonomous vehicles and of a pedestrian or bicyclist, the method comprising:

receiving a route of the pedestrian or bicyclist that extends at least partially along a road network comprised of a plurality of road segments;

accessing routes to be driven by the one or more autonomous vehicles; and synchronizing the route of the pedestrian or bicyclist with a route of the routes to be driven by the one or more autonomous vehicles such that the one or more autonomous vehicles drive alongside the pedestrian or bicyclist while the pedestrian or bicyclist proceeds along at least a portion of the route of the pedestrian or bicyclist, wherein synchronizing the route comprises analyzing the routes of a plurality of autonomous vehicles to identify the route of the one or more autonomous vehicles that corresponds to the route of the pedestrian or bicyclist in terms of one or more road segments included in the routes of the one or more autonomous vehicles and of the pedestrian or bicyclist and a time at which the one or more autonomous vehicles and the pedestrian or bicyclist will proceed along the one or more road segments.

2. A method according to claim 1 further comprising providing for autonomous control of the one or more autonomous vehicles so as to drive alongside the pedestrian or bicyclist while the pedestrian or bicyclist proceeds along at least a portion of the route.

3. A method according to claim 1 wherein synchronizing the route of the pedestrian or bicyclist with the route of the one or more autonomous vehicles comprises modifying one or more road segments included in the route of the pedestrian or bicyclist or the time at which the pedestrian or bicyclist will proceed along the one or more road segments in order to correspond to the route of the one or more autonomous vehicles.

4. A method according to claim 1 wherein synchronizing the route of the pedestrian or bicyclist with the route of the one or more autonomous vehicles comprises modifying one or more road segments included in the route of the one or more autonomous vehicles or the time at which the one or more autonomous vehicles will proceed along the one or more road segments in order to correspond to the route of the pedestrian or bicyclist.

5. A method according to claim 1 wherein synchronizing the route of the pedestrian or bicyclist with the route of the one or more autonomous vehicles comprises synchronizing a first portion of the route of the pedestrian or bicyclist with the route of a first autonomous vehicle and synchronizing a second portion of the route of the pedestrian or bicyclist with the route of a second autonomous vehicle.

6. A method according to claim 1 further comprising supporting communication between the pedestrian or the bicyclist or a device carried by the pedestrian or the bicyclist and the one or more autonomous vehicles while the one or more autonomous vehicles drive alongside the pedestrian or bicyclist.

7. A method according to claim 1 further comprising providing for an augmented reality presentation to the pedestrian or the bicyclist in order to provide an indication of the one or more autonomous vehicles that drive alongside the pedestrian or bicyclist or a virtual lane established for the pedestrian or bicyclist by the one or more autonomous vehicles that drive alongside the pedestrian or bicyclist.

8. A method according to claim 1 wherein the route of the pedestrian or bicyclist comprises a sequence of road segments and identifies the time at which the pedestrian or bicyclist will proceed along the one or more road segments of the sequence.

9. An apparatus for synchronizing routes of one or more autonomous vehicles and of a pedestrian or bicyclist, the apparatus comprising at least one processor and at least one non-transitory memory including computer program code instructions stored therein, the computer program code instructions configured to, when executed by the at least one processor, cause the apparatus at least to:
receive a route of a pedestrian or bicyclist that extends at least partially along a road network comprised of a plurality of road segments;
access routes to be driven by one or more autonomous vehicles; and
synchronize the route of the pedestrian or bicyclist with a route of the routes to be driven by the one or more autonomous vehicles such that the one or more autonomous vehicles drive alongside the pedestrian or bicyclist while the pedestrian or bicyclist proceeds along at least a portion of the route of the pedestrian or bicyclist,
wherein the apparatus is caused to synchronize the route by analyzing the routes of a plurality of autonomous vehicles to identify the route of the one or more autonomous vehicles that corresponds to the route of the pedestrian or bicyclist in terms of one or more road segments included in the routes of the one or more autonomous vehicles and of the pedestrian or bicyclist and a time at which the one or more autonomous vehicles and the pedestrian or bicyclist will proceed along the one or more road segments.

10. An apparatus according to claim 9 wherein the computer program code instructions are further configured to, when executed by the at least one processor, cause the apparatus to provide for autonomous control of the one or more autonomous vehicles so as to drive alongside the pedestrian or bicyclist while the pedestrian or bicyclist proceeds along at least a portion of the route.

11. An apparatus according to claim 9 wherein the computer program code instructions are configured to, when executed by the at least one processor, cause the apparatus to synchronize the route of the pedestrian or bicyclist with the route of the one or more autonomous vehicles by modifying one or more road segments included in the route of the pedestrian or bicyclist or the time at which the pedestrian or bicyclist will proceed along the one or more road segments in order to correspond to the route of the one or more autonomous vehicles.

12. An apparatus according to claim 9 wherein the computer program code instructions are further configured to, when executed by the at least one processor, cause the apparatus to synchronize the route of the pedestrian or bicyclist with the route of the one or more autonomous vehicles by modifying one or more road segments included in the route of the one or more autonomous vehicles or the time at which the one or more autonomous vehicles will proceed along the one or more road segments in order to correspond to the route of the pedestrian or bicyclist.

13. An apparatus according to claim 9 wherein the computer program code instructions are further configured to, when executed by the at least one processor, cause the apparatus to synchronize the route of the pedestrian or bicyclist with the route of the one or more autonomous vehicles by synchronizing a first portion of the route of the pedestrian or bicyclist with the route of a first autonomous vehicle and synchronizing a second portion of the route of the pedestrian or bicyclist with the route of a second autonomous vehicle.

14. An apparatus according to claim 9 wherein the computer program code instructions are further configured to, when executed by the at least one processor, cause the apparatus to support communication between the pedestrian or the bicyclist or a device carried by the pedestrian or the bicyclist and the one or more autonomous vehicles while the one or more autonomous vehicles drive alongside the pedestrian or bicyclist.

15. An apparatus according to claim 9 wherein the computer program code instructions are further configured to, when executed by the at least one processor, cause the apparatus to provide for an augmented reality presentation to the pedestrian or the bicyclist in order to provide an indication of the one or more autonomous vehicles that drive alongside the pedestrian or bicyclist or a virtual lane established for the pedestrian or bicyclist by the one or more autonomous vehicles that drive alongside the pedestrian or bicyclist.

16. An apparatus according to claim 9 wherein the route of the pedestrian or bicyclist comprises a sequence of road segments and identifies the time at which the pedestrian or bicyclist will proceed along the one or more road segments of the sequence.

17. An apparatus for coordinating one or more traffic control elements of a road network infrastructure with a route of a pedestrian or bicyclist, the apparatus comprising at least one processor and at least one non-transitory memory including computer program code instructions stored therein, the computer program code instructions configured to, when executed by the at least one processor, cause the apparatus at least to:

receive a route of a pedestrian or bicyclist that extends at least partially along a road network, wherein the route of the pedestrian or bicyclist identifies a plurality of road segments of the road network in sequence and a time at which the pedestrian or bicyclist will proceed along one or more of the plurality of road segments; and based upon the route of the pedestrian or the bicyclist, control at least a portion of the road network infrastructure including the one or more traffic control elements such that the one or more traffic control elements permit the pedestrian or the bicyclist to proceed unimpeded along at least a portion of the route.

18. An apparatus according to claim 17 wherein the one or more traffic control elements comprise one or more road signs, crosswalk signals or traffic lights.

19. An apparatus according to claim 17 further comprising receiving location information regarding a location of the pedestrian or the bicyclist along the route, wherein the computer program code instructions are configured to, when executed by the at least one processor, cause the apparatus to control at least a portion of the road network infrastructure by controlling at least a portion of the road network infrastructure including the one or more traffic control elements based upon the location information.

20. An apparatus according to claim 17 further comprising receiving information indicating a number of pedestrians or bicyclists who will proceed along the route, wherein the computer program code instructions are configured to, when executed by the at least one processor, cause the apparatus to control at least a portion of the road network infrastructure by controlling at least a portion of the road network infrastructure including the one or more traffic control elements in a manner that is dependent upon the number of pedestrians or bicyclists satisfying a threshold.

* * * * *